US008622355B2

(12) United States Patent
Pryor et al.

(10) Patent No.: US 8,622,355 B2
(45) Date of Patent: Jan. 7, 2014

(54) EXTENDIBLE LEG ASSEMBLY AND RETAINING SYSTEM

(75) Inventors: Steven Pryor, Dallas, TX (US); Robert L. Stewart, Grapevine, TX (US)

(73) Assignee: Paragon Furniture LP, Arlington, TX (US)

( * ) Notice: Subject to any disclaimer, the term of this patent is extended or adjusted under 35 U.S.C. 154(b) by 273 days.

(21) Appl. No.: 12/781,817

(22) Filed: May 18, 2010

(65) Prior Publication Data

US 2011/0284704 A1 Nov. 24, 2011

(51) Int. Cl.
*F16M 11/26* (2006.01)

(52) U.S. Cl.
USPC ..... 248/188.5; 248/157; 248/161; 248/125.8; 248/354.5; 108/147.12; 108/147.13; 403/109.1; 403/109.6

(58) Field of Classification Search
USPC ........... 248/161, 407, 188.2, 188.5, 157, 423, 248/125.8, 354.3, 312.1, 354.1, 354.4, 248/354.5; 403/13, 109.1, 365, 108, 109.2, 403/109.5, 109.6; 108/131, 147.11, 147.13, 108/147.15; 211/181.1, 187
See application file for complete search history.

(56) References Cited

U.S. PATENT DOCUMENTS

| | | | | |
|---|---|---|---|---|
| 2,289,818 | A | 7/1942 | Winner | |
| 3,083,041 | A | 3/1963 | Owenmark | |
| 3,515,418 | A | 6/1970 | Nielsen, Jr. | |
| 5,025,820 | A | 6/1991 | Gamper | |
| 5,549,407 | A | 8/1996 | Levi | |
| 5,638,914 | A | 6/1997 | Kizzia | |
| 5,876,048 | A * | 3/1999 | Lee | 280/47.315 |
| 6,027,087 | A | 2/2000 | Lindemann et al. | |
| 6,079,575 | A * | 6/2000 | Wang | 211/187 |
| 6,173,660 | B1 | 1/2001 | Emmert | |
| 6,520,192 | B1 | 2/2003 | Lo | |
| 6,550,730 | B1 * | 4/2003 | Hong | 248/219.4 |
| 6,663,071 | B2 | 12/2003 | Peterson | |
| 6,695,156 | B1 * | 2/2004 | Wang | 211/187 |
| 6,817,303 | B2 * | 11/2004 | Gosselin | 108/131 |
| 6,830,227 | B2 * | 12/2004 | Nakatani | 248/354.3 |
| 8,016,140 | B2 * | 9/2011 | Hsieh | 211/187 |
| 8,075,217 | B2 * | 12/2011 | Eason | 403/109.1 |
| 8,147,358 | B2 * | 4/2012 | Chen | 473/492 |
| 2006/0062632 | A1 * | 3/2006 | Jang | 403/109.6 |
| 2009/0087251 | A1 * | 4/2009 | Chen | 403/109.1 |
| 2009/0274511 | A1 | 11/2009 | Chen | |
| 2011/0036278 | A1 * | 2/2011 | Karl et al. | 108/147.13 |

* cited by examiner

*Primary Examiner* — Todd M. Epps

(74) *Attorney, Agent, or Firm* — Kirby B. Drake; Klemchuk Kubasta LLP

(57) ABSTRACT

The present disclosure could generally provide a system for use with a furniture or desk assembly having an extendible leg assembly and retaining system. In one embodiment, the system could be easily and safely adjustable, while maintaining a particular height and overall structural integrity of a furniture or desk system to, for example, withstand considerable weight and pressure exerted thereto.

4 Claims, 4 Drawing Sheets

EXTENDIBLE LEG ASSEMBLY AND RETAINING SYSTEM

The present disclosure relates generally to furniture and, in particular, to a system of providing, adjusting, and retaining extendible leg assemblies.

BACKGROUND

Most conventional furniture and desk systems typically include standard, non-adjustable, folding, or telescoping leg assemblies. While some conventional furniture and desk systems are adjustable in height, most typically fail to provide a system that is easily and safely adjustable, while maintaining the overall structural integrity of the furniture or desk system to, for example, withstand considerable weight and pressure exerted thereto.

An object of the present disclosure is to generally provide a safe, extendible leg assembly and retaining system capable of withstanding considerable weight and pressure.

SUMMARY

Embodiments of the present disclosure generally provide an extendible leg assembly and retaining system. In one embodiment, the present disclosure could provide an adjusting and retaining system that is easily and safely adjustable, while maintaining a particular height and overall structural integrity of a furniture or desk system to, for example, withstand considerable weight and pressure exerted thereto.

Other technical features may be readily apparent to one skilled in the art from the following figures and descriptions.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1A:
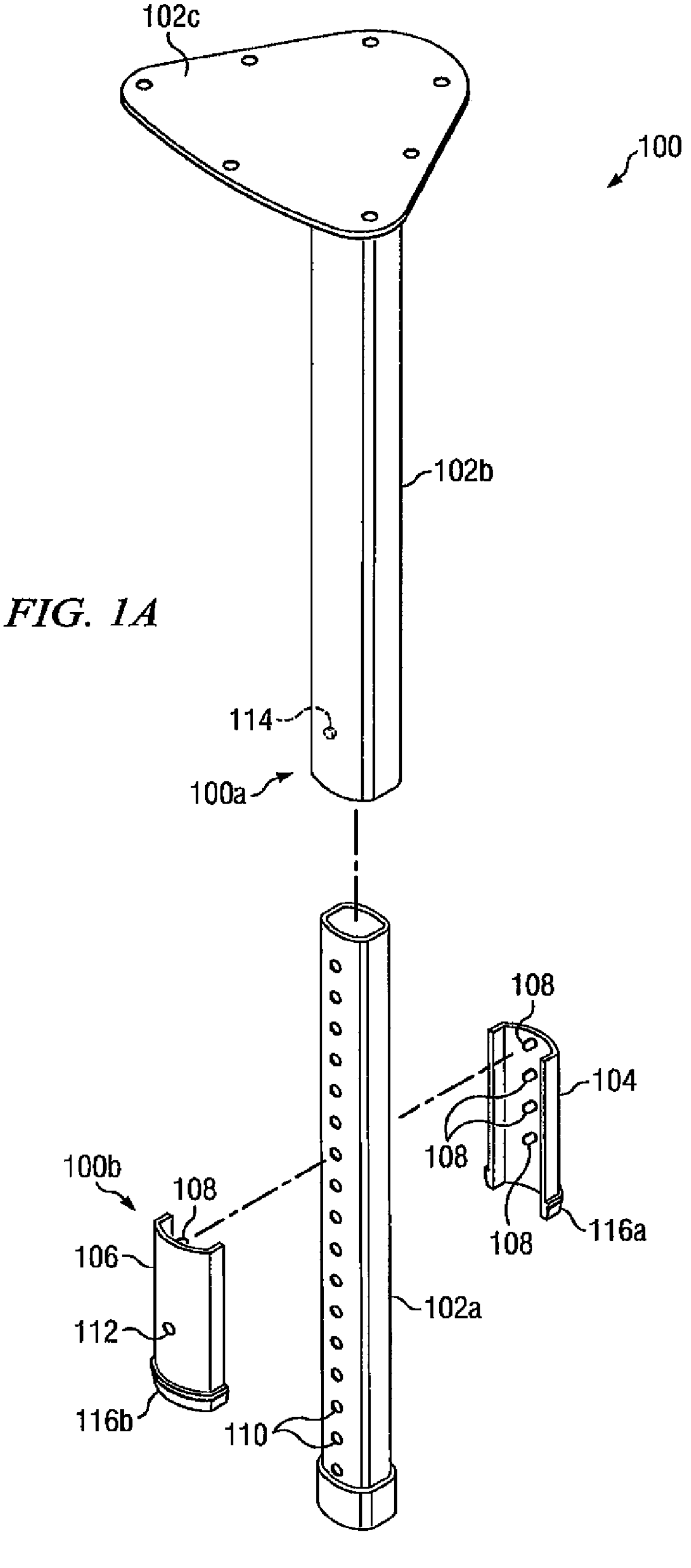
FIGS. 1A and 1B are somewhat simplified exploded views of the leg assembly and retaining system according to one embodiment of the present disclosure.

Embodiments of the present disclosure generally provide an extendible leg assembly and retaining system. In one embodiment, the present disclosure could provide a system that is easily and safely adjustable, while maintaining a particular height and overall structural integrity of a furniture or desk system to, for example, withstand considerable weight and pressure exerted thereto.

FIGS. 1A-2E are somewhat simplified illustrations of extendible leg assembly 100*a* and retainer system 100*b* (collectively referred to herein as system 100) and parts of system 100 according to one embodiment of the present disclosure. It should be understood that system 100 shown in FIGS. 1A-2E are for illustrative purposes only and that any other suitable system or subsystem could be used in conjunction with or in lieu of system 100 and parts of system 100 according to one embodiment of the present disclosure.

In one embodiment, system 100 could include distal leg portion 102*a* and proximate leg portion 102*b* (collectively referred to herein as leg portions 102). System 100 could also include mounting plate 102*c*, distal collar 104, proximate collar 106, lips 116*a* and 116*b* (collectively referred to herein as lips 116), protrusions 108, holes 110, and bores 112 and 114 according to one embodiment of the present disclosure.

Figure 1B:
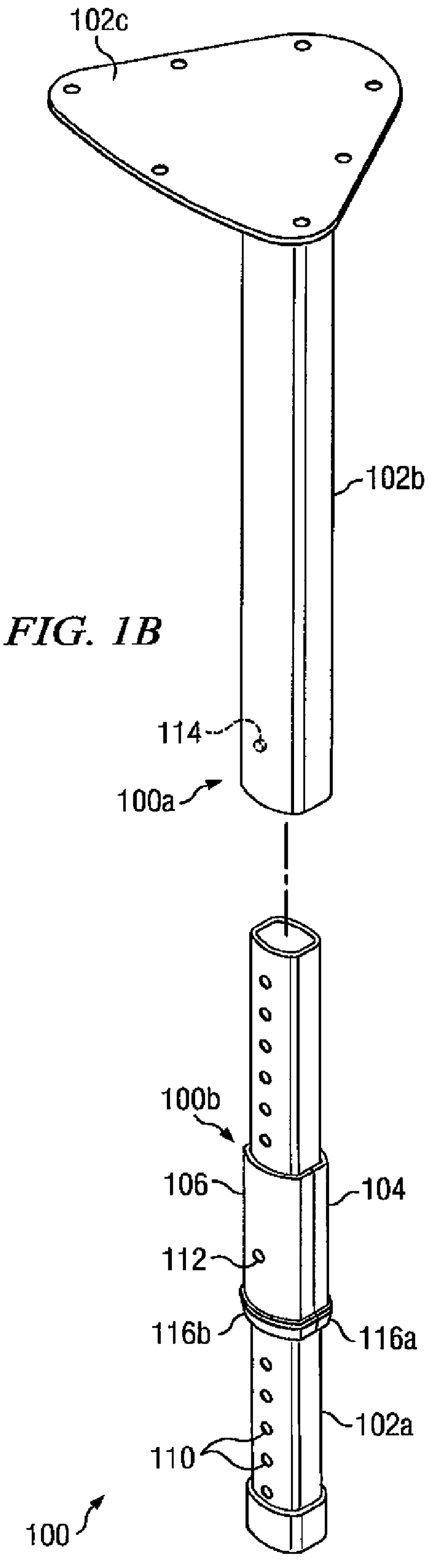
Figure 1C:
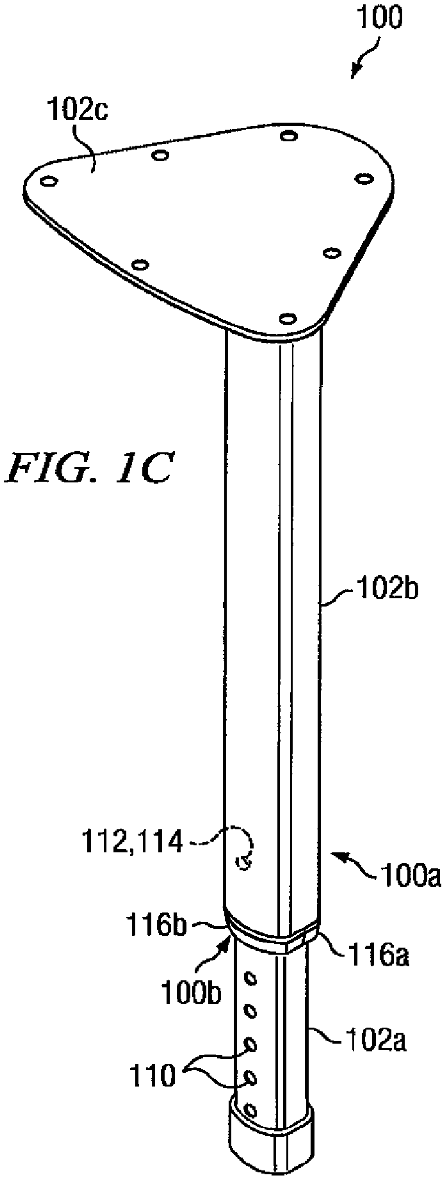
FIG. 1C is a somewhat simplified illustration of the system shown in FIGS. 1A and 1B in an engaged position according to one embodiment of the present disclosure.
Figure 2A:
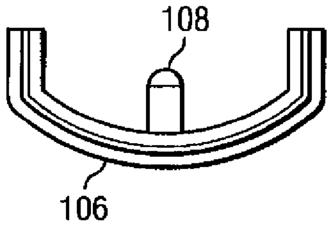
FIG. 2A is a somewhat simplified plan view of one portion of a collar for use with the system shown in FIGS. 1A-1C according to one embodiment of the present disclosure.
Figure 2B:
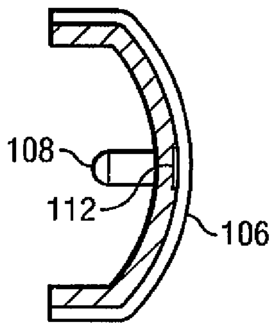
FIG. 2B is a somewhat simplified cross-sectional view of one portion of a collar for use with the system shown in FIGS. 1A-1C according to one embodiment of the present disclosure.
Figure 2C:
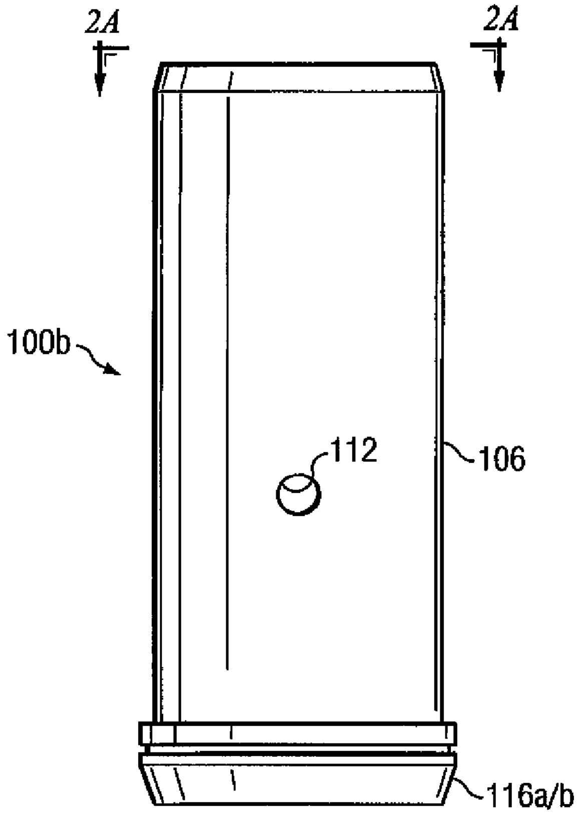
FIG. 2C is a somewhat simplified perspective view of the collar shown in FIG. 2A according to one embodiment of the present disclosure.
Figure 2D:
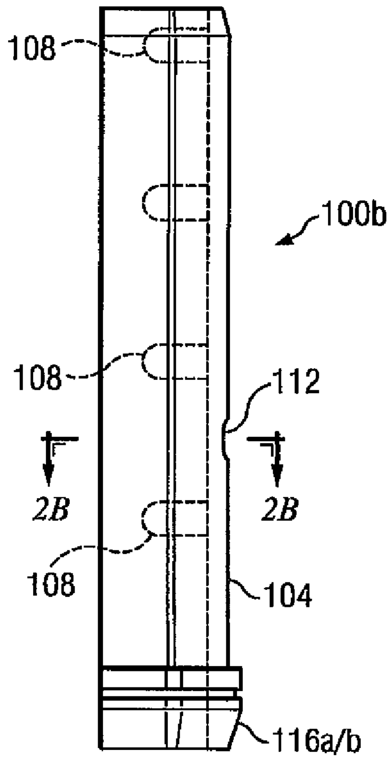
FIG. 2D is a somewhat simplified side perspective view of a portion of the collar shown in FIG. 2C according to one embodiment of the present disclosure.
Figure 2E:
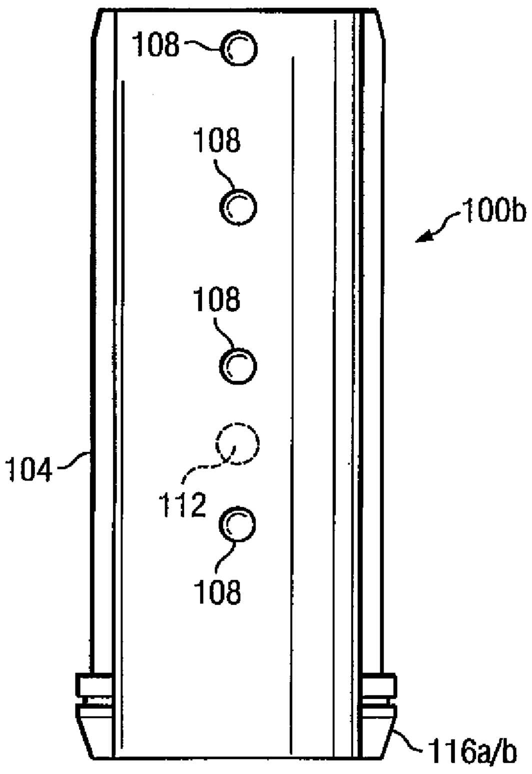
FIG. 2E is a somewhat simplified view of the inside surface of the collar shown in FIGS. 2A-2D according to one embodiment of the present disclosure.

Distal leg portion 102*a* could include an elongated hollow pipe-like structure having multiple holes 110 aligned on one side according to one embodiment of the present disclosure as generally shown in FIGS. 1A, 1B, and 1C. In one embodiment, holes 110 could include an outer diameter of about 0.250 inches. Similarly, proximate leg portion 102*b* could include an elongated hollow pipe-like structure as generally shown in FIGS. 1A, 1B, and 1C.

It should be understood that distal leg portion 102*a* could include any suitable number, size, shape, or configuration of holes 110 and that holes 110 could be aligned in any suitable manner according to one embodiment of the present disclosure. For example, although holes 110 shown in FIGS. 1A, 1B, and 1C are generally annular shaped, holes 110 and retaining system 100*b* could include one or more slots, diamonds, squares, rectangles, pentagon, ovals, other suitable shapes, or any combination thereof.

In one embodiment, holes 110 could be marked to provide an indication of the approximate length of extendible leg assembly 100*a* (or resulting height of the furniture or desk system using extendible leg assembly 100*a*) should that particular hole be used to retain extendible leg assembly 100*a* as later described herein. In one embodiment, holes 110 could include or be associated with a corresponding label, number, letter, color code, specific height dimension, etch, designator, indicator, other suitable marking, or any combination thereof. Accordingly, multiple extendible leg assemblies 110*a* could be easily assembled or adjusted to be at a uniform length or desired setting using such markings.

Although proximate leg portion 102*b* shown in FIG. 1A does not include multiple holes 110 or any other mechanisms for adjusting or setting the length of extendible leg assembly 100*a*, it should be understood that proximate leg portion 102*b* could also include multiple holes 110 in any suitable number, size, shape, or configuration and such holes 110 could be disposed in any suitable manner according to one embodiment of the present disclosure.

Distal leg portion 102*a* and proximate leg portion 102*b* could be disposed to support a table, desk, furniture item, countertop, board, other suitable item or surface, or any combination thereof according to one embodiment of the present disclosure. For example, in a desk system application, four pairs of distal leg portion 102*a* and proximate leg portion 102*b* could be used to support the desk system and maintain a particular height between a surface of the desk system and a supporting surface such as the ground or floor. It should be understood that any suitable number of pairs of distal leg portion 102*a* and proximate leg portion 102*b* could be used to support such items or surfaces.

Distal leg portion 102*a* and proximate leg portion 102*b* could be coupled together and disposed in a generally telescopic manner and customized, reconfigured, or adjusted to provide a certain size, shape, configuration, position, purpose, utility, decorative look, other suitable disposition, or any combination thereof according to one embodiment of the present disclosure. For example, distal leg portion 102*a* and proximate leg portion 102*b* could be coupled together by disposing a portion of distal leg portion 102*a* within the interior of proximate leg portion 102*b* in a generally telescopic manner as shown in FIGS. 1A, 1B, and 1C.

In one embodiment, distal leg portion 102*a* and proximate leg portion 102*b* could include a generally rectangular shaped cross-section having rounded off or edged off corners as shown in FIGS. 1A, 1B, and 1C. In one particular embodiment, distal leg portion 102*a* and proximate leg portion 102*b* could an elongated and generally hollow structure with a cross-section having a rounded rectangular shape with generally straight shorter sides and outwardly curved longer sides. The outwardly curved longer sides could include a radius of curvature generally equal to about 1.311 inches.

It should be understood that distal leg portion 102*a* and proximate leg portion 102*b* could include any suitably shaped structure including, for example, an elongated and generally hollow structure having a cross-section similar to a circle, oval, square, rectangle, rounded rectangle, rounded square, hexagon, rounded hexagon, or any combination thereof according to one embodiment of the present disclosure.

In one embodiment, the overall shape and configuration of distal leg portion 102*a* and proximate leg portion 102*b* could be selected for meeting or exceeding certain pressure and weight restrictions, structural integrity specifications, ergonomic feasibility factors, manufacturing costs, conservation of materials requirements, functionality issues, safety requirements, aesthetic appeal factors, other suitable specifications or factors, or any combination thereof.

In one embodiment, distal leg portion 102*a* and proximate leg portion 102*b* could be made of, composed of, coated with, layered with, or otherwise include, for example, laminate, veneer, wood, melamine, solid surface, fiberglass, steel, stainless steel, aluminum, metal, mesh, plastic, paint, lacquer, polypropylene, polyurethane, polyethylene, polyvinyl chloride (PVC), silicon, polytetrafluoroethylene (PTFE), polyester, high-gloss polyester, synthetic rubber, natural rubber, polymer, natural fiber, synthetic fiber, other suitable materials, or any combination thereof according to one embodiment of the present disclosure.

In one embodiment, distal leg portion 102*a* and proximate leg portion 102*b* could include a wire management system to help hide from view, organize, or route wires associated with accessories, electrical outlets, telecommunications-related outlets, Ethernet outlets, WAN outlets, satellite outlets, cable outlets, audio/visual outlets, wire management systems, other suitable structures, connections, outlets, or areas, or any combination thereof.

In one embodiment, at one end, distal leg portion 102*a* could include any suitable number of accessories including, for example, friction pads, wheels, rubber stoppers, adjustable leveling mechanisms, other suitable devices or mechanisms, or any combination thereof. Accordingly, such devices or mechanisms could make contact with the ground or floor when system 100 is fully installed in a furniture system or desk system and when the same is placed in an upright position.

In one embodiment, distal leg portion 102*a* could be made of steel and include a height of about 18.0 inches, a width of about 1.626 inches, and an outer diameter of about 1.311 inches, and an inner diameter of about 1.246 inches.

In one embodiment, proximate leg portion 102*b* could be made of steel and include a height of about 20.0 inches, a width of about 1.890 inches, an outer diameter of about 1.528 inches, and an inner diameter of about 1.445 inches.

Mounting plate 102*c* could be part of or secured to one end of proximate leg portion 102*b* in any suitable manner according to one embodiment of the present disclosure. In one embodiment, mounting plate 102*c* and proximate leg portion 102*b* could be a single molded piece. Mounting plate 102*c* could aid in securing or otherwise retaining proximate leg portion 102*b* to a surface of, for example, a table, desk, furniture item, countertop, board, other suitable item or surface, or any combination thereof.

Mounting plate 102*c* could include any suitable number of holes used to screw, nail, clasp, or otherwise secure or retain mounting plate to the surface of, for example, a desk. It should be understood that mounting plate 102*c* could include any suitable size, shape, configuration, position, purpose, utility, decorative look, other suitable disposition, or any combination thereof and could be made of any suitable material or combination of materials including those described above in conjunction with distal leg portion 102*a* and proximate leg portion 102*b* according to one embodiment of the present disclosure.

In one embodiment, mounting plate 102*c* could be made of steel and include a length of about 7.62 inches, a width of about 9.0 inches, and a thickness of about 0.13 inches.

Retainer system 100*b* could aid in retaining distal leg portion 102*a* and proximate leg portion 102*b* in one of a number of positions relative to the other as generally shown in FIGS. 1A, 1B, and 1C according to one embodiment of the present disclosure. Each of distal collar 104 and proximate collar 106 could include lips 116 and protrusions 108. In one embodiment, retaining system 100*b* could include two identical collars such as, for example, distal collar 104 and proximate collar 106. In one embodiment, distal collar 104 and proximate collar 106 could include identical generally elongated C-shaped bodies as shown in FIGS. 1A and 2A-2E.

In one embodiment, two generally identical collars are used as retainer system 100*b* and thus system 100 could be manufactured at a lower cost and assembled/installed with relative ease according to one embodiment of the present disclosure. It should be understood, however, that distal collar 104 and proximate collar 106 could include any suitable size, shape, configuration, position, purpose, utility, decorative look, other suitable disposition, or any combination thereof and could be made of any suitable material or combination of materials including those described above in conjunction with distal leg portion 102*a* and proximate leg portion 102*b*.

Although not shown in FIGS. 1A-2E, distal collar 104 and proximate collar 106 could include a mechanism to temporarily hold one to the other according to one embodiment of the present disclosure. For example, distal collar 104 and proximate collar 106 could include a snap fit mechanism, magnetic system, latching system, other suitable locking, retaining, or securing mechanism, or any combination thereof.

Distal collar 104 and proximate collar 106 could be used to mate, couple, link, or otherwise join one or more retaining systems 100*b* together with distal leg portion 102*a* according to one embodiment of the present disclosure. Distal collar 104 and proximate collar 106 could be any suitably shaped, sized, or configured collar-like structure. Distal collar 104 and proximate collar 106 each could include a relatively smooth exterior surface having a tapered end and lip end according to one embodiment of the present disclosure as generally shown in FIGS. 2A-2D. Distal collar 104 and proximate collar 106 each could include a relatively smooth interior surface having a number of protrusions 108 as generally shown in FIGS. 1A, 2A, 2B, 2D, and 2E according to one embodiment of the present disclosure. In one embodiment, protrusions 108 could be made of nylon and include a length of about 0.500 inches and an outer diameter of about 0.23 inches.

Distal collar 104 and proximate collar 106 could be removably affixed to distal leg portion 102$a$ by aligning one or more protrusions 108 to one or more holes 110 as generally shown in FIG. 1A according to one embodiment of the present disclosure. When aligned and properly positioned, distal collar 104 and proximate collar 106 fit snugly against the exterior surface of distal leg portion 102$a$ and allows a certain portion of distal leg portion 102$a$ and retaining system 100$b$ to be disposed within an interior portion of proximate leg portion 102$b$ as generally shown in FIGS. 1B and 1C.

In one embodiment, when in an engaged position relative to distal leg portion 102$a$ and proximate leg portion 102$b$, the tapered ends of distal collar 104 and proximate collar 106 could be disposed within an interior portion of proximate leg portion 102$b$ as generally shown in FIGS. 1A, 1B, and 1C. When in a fully engaged position relative to distal leg portion 102$a$ and proximate leg portion 102$b$, the lip ends of each of distal collar 104 and proximate collar 106 (and in particular its respective lips 116$a$ and 116$b$), abut against an edge of an opening of proximate leg portion 102$b$ as shown in FIGS. 1A, 1B, and 1C. Lips 116 could thus aid in securing retaining system 100$b$ and retaining leg assembly 100$a$ in a relative position according to one embodiment of the present disclosure.

In one embodiment, distal collar 104 and proximate collar 106 could be made of nylon and include a length of about 4.25 inches, a width of about 1.884 inches, an outer diameter of about 1.421 inches, an inner diameter of about 1.311 inches, and a thickness of about 0.125 inches.

Although retaining system 100$b$ is shown as a generally two-collar system that aligns protrusions 108 to holes 110 as shown in FIGS. 1A, 1B, and 1C, it should be understood that retaining system 100$b$ could include any number of suitable mechanisms for aligning and retaining distal leg portion 102$a$ and proximate leg portion 102$b$. For example, retaining system 100$b$ could include a slotted system by which holes 110 could be slots in which elongated, generally rectangular shaped protrusions could be inserted into. As another example, retaining system 102$a$ could adjust the relative lengths of distal leg portion 102$a$ and proximate leg 102$b$ using one or more vertically disposed slots along one or more surfaces of distal leg portion 102$a$ (and/or proximate leg portion 102$b$).

Lips 116 could include any suitably shaped, sized, or configured lip-like structure according to one embodiment of the present disclosure. In addition, lips 116 could be designed to meet or exceed certain pressure and weight restrictions, structural integrity specifications, ergonomic feasibility factors, manufacturing costs, conservation of materials requirements, safety requirements, functionality issues, aesthetic appeal factors, other suitable specifications or factors, or any combination thereof according to one embodiment of the present disclosure.

In one embodiment, lips 116 could be made of nylon and include a length of about 0.500 inches, a width of about 2.050 inches, an outer diameter of about 1.528 inches, an inner diameter of about 1.311 inches, and a thickness of about 0.208 inches.

It should be understood that once distal leg portion 102$a$ and proximate leg portion 102$b$ are properly fitted with distal collar 104 and proximate collar 106 (i.e., retaining system 100$b$ is properly abutted against proximate leg portion 102$b$), the length of system 100 is relatively secure. In one embodiment, a set screw such as, for example, a pressure fit set screw, could be used to provide additional support for and security to system 100. For example, as students use a desk system having system 100 installed on it, those students cannot adjust the height of system 100 without first positioning the desk system upside down.

Bores 112 and 114 could be used to install the set screw described above according to one embodiment of the present disclosure. For example, when the lip ends of each of distal collar 104 and proximate collar 106 (and in particular its respective lips 116) are aligned and properly installed on distal leg portion 102$a$ and proximate leg portion 102$b$, bores 112 and 114 are generally aligned as FIG. 1C.

In one example, should the furniture or desk system using system 100 require additional support or accessories, bores 112 and 114 could be aligned and a set screw placed therein to secure system 100. It should be understood that bores 112 and 114 could be any suitably shaped, sized, or configured hole or hole-like structure. In one embodiment, bores 112 and 114 could include an outer diameter of about 0.187 inches.

Accordingly, system 100 generally provides an extendible leg assembly 100$a$ and retaining system 100$b$. In one embodiment, system 100 could provide an adjusting and retaining system that is easily and safely adjustable, while maintaining a particular height and overall structural integrity of a furniture or desk system to, for example, withstand considerable weight and pressure exerted thereto.

It may be advantageous to set forth definitions of certain words and phrases used in this patent document. The term “couple” and its derivatives refer to any direct or indirect communication between two or more elements, whether or not those elements are in physical contact with one another. The terms “include” and “comprise,” as well as derivatives thereof, mean inclusion without limitation. The term “or” is inclusive, meaning and/or. The phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure and the following claims.

What is claimed is:

1. An extendible leg assembly comprising:

a first leg portion having a first end coupled to a mounting plate;

a second leg portion having a plurality of vertical holes and configured to coaxially dispose within a portion of the first leg portion through a second end of the first leg portion; and a collar removably affixed to the second leg portion and having a lip structure disposed on a proximal end of the collar and a plurality of protrusions vertically disposed on an interior surface of the collar to engage with the plurality of vertical holes, wherein when the assembly is in a fully engaged position, the lip abuts against an edge of the second end of the first leg portion to lock the assembly; and wherein the collar comprises a first collar portion and a second collar portion removably coupled to each other.

2. An extendible leg assembly comprising:

a first leg portion;

a collar removably affixed to a second leg portion and comprising a lip disposed on a proximal end of the collar, a second end having a tapered edge disposed on a distal end of the collar, and a plurality of protrusions vertically disposed on an interior surface of the collar;

the second leg portion having a plurality of vertical holes and configured to coaxially dispose within at least a portion of an open end of the first leg portion; and the first leg portion having a second end coupled to a mounting plate;

wherein at least one of the plurality of protrusions engages with at least one of the plurality of vertical holes;

wherein when the assembly is in a fully engaged position, the lip abuts against an edge of the open end of the first leg portion to lock the assembly; and wherein the removable collar comprises a first collar portion and a second collar portion removably coupled to each other.

3. An extendible leg assembly comprising:

a first leg portion;

a collar removably affixed to a second leg portion and comprising a lip disposed on a proximal end of the collar, a second end having a tapered edge disposed on a distal end of the collar, and a plurality of protrusions vertically disposed on an interior surface of the collar, wherein the collar comprises a first collar portion and a second collar portion removably coupled to each other; and the second leg portion having an elongated hollow body, a rounded rectangular shaped cross-section having longer sides that are outwardly curved, and a plurality of vertical holes, the second leg portion configured to coaxially dispose within an open end of the first leg portion;

wherein at least one of the plurality of protrusions engages with at least one of the plurality of vertical holes; and wherein when the assembly is in a fully engaged position, the lip abuts against an edge of the open end of the first leg portion to lock the assembly.

4. The assembly of claim 3, wherein the plurality of vertical holes and the plurality of protrusions are selectively coupled together to maintain a particular length of the extendible leg assembly.

* * * * *